March 17, 1959 J. L. HERR 2,877,914
FEED MIXING APPARATUS
Filed Sept. 5, 1957 3 Sheets-Sheet 1
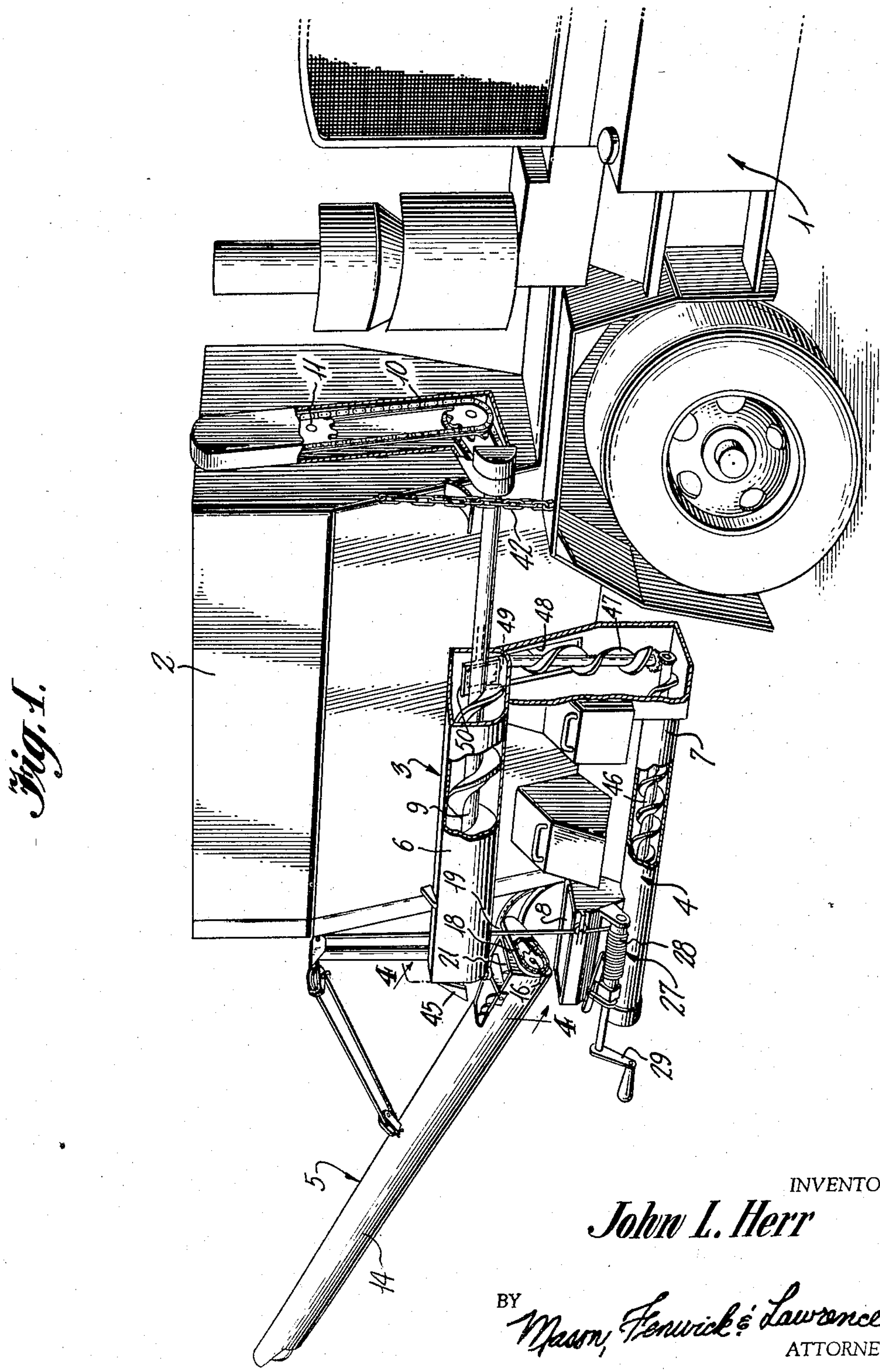

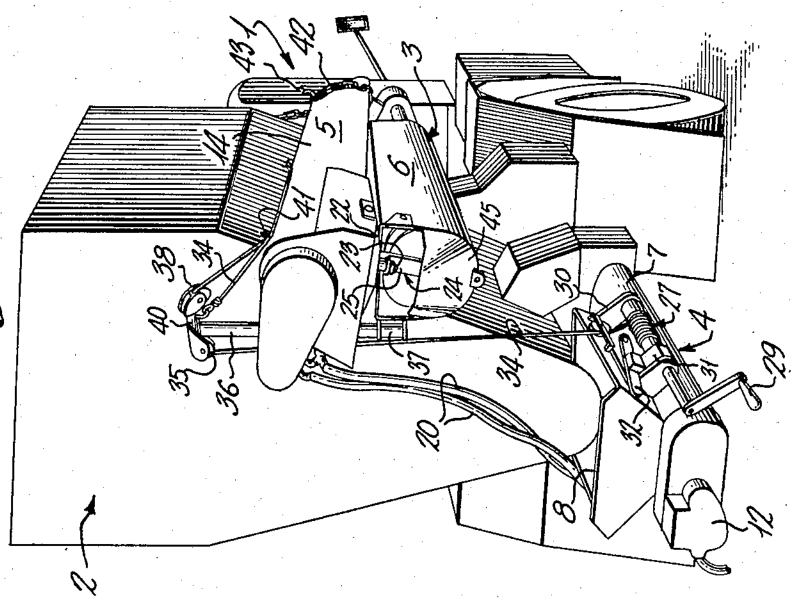
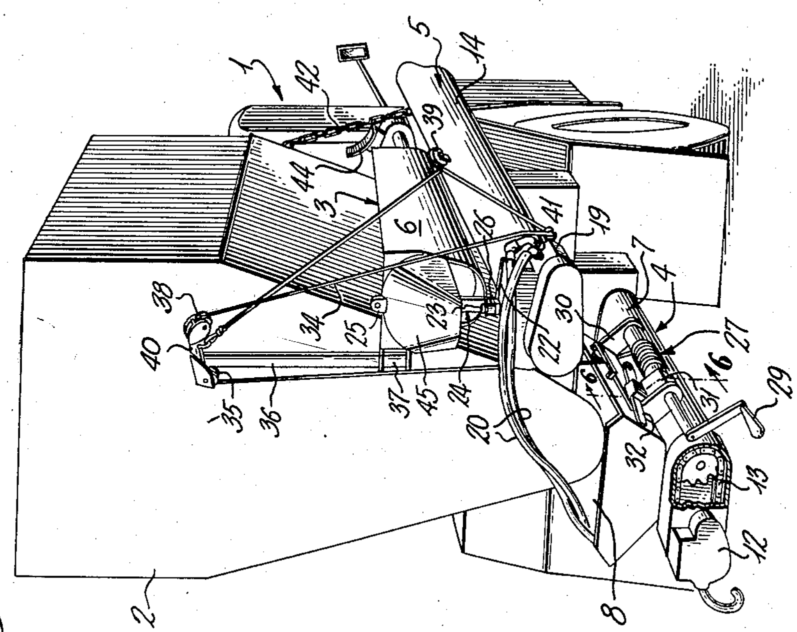
INVENTOR
John L. Herr
BY
Mason, Fenwick & Lawrence
ATTORNEYS March 17, 1959
J. L. HERR
2,877,914
FEED MIXING APPARATUS
Filed Sept. 5, 1957
3 Sheets-Sheet 3
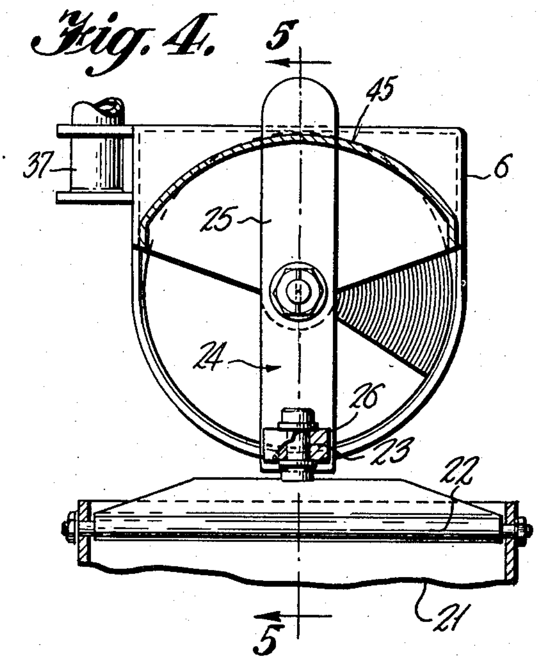
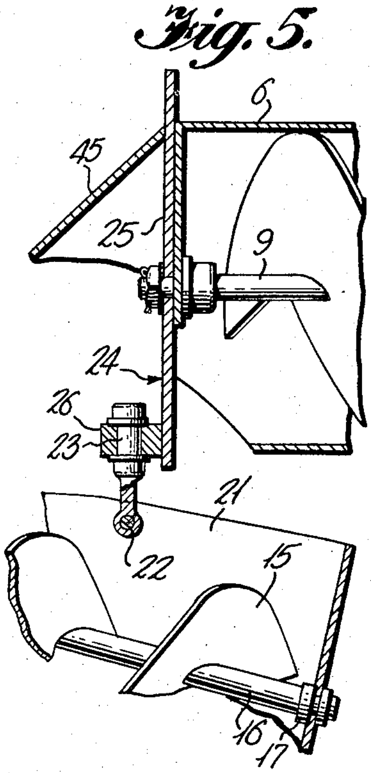
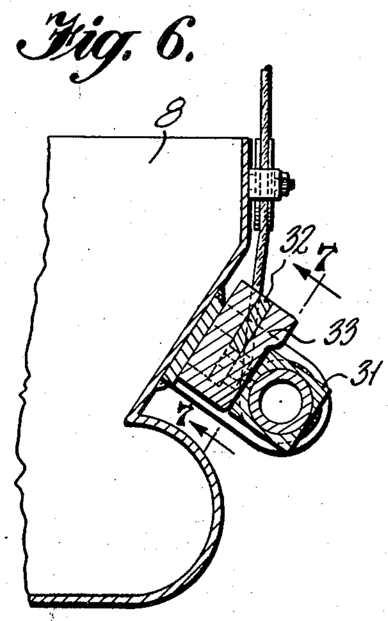
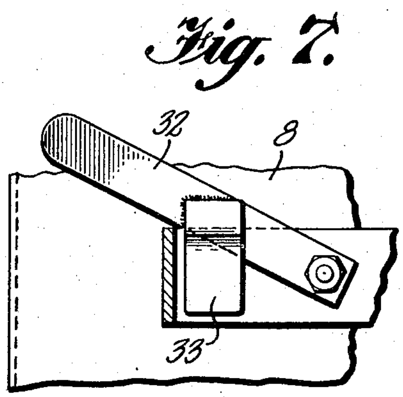
INVENTOR
John L. Herr
BY Mason, Fenwick & Lawrence
ATTORNEYS United States Patent Office 2,877,914 Patented Mar. 17, 1959

2,877,914

FEED MIXING APPARATUS

John Lee Herr, Nottingham, Pa., assignor to Herr and Futty, Nottingham, Pa., a corporation of Delaware Application September 5, 1957, Serial No. 682,134

6 Claims. (Cl. 214—522)

This invention relates to feed mixing apparatus and particularly to an attachment for mixing apparatus of the general nature of that disclosed in United States Patents Nos. 2,546,747, dated March 27, 1951, and 2,576,177, dated November 27, 1951.

Mixing apparatus such as that disclosed in the above-mentioned prior patents has been designed for mounting upon trucks so that a mobile grinding and mixing plant is available. This permits use of a single piece of equipment for mixing at a number of locations and provides for mixing while the feed is being carried from a storage place for the several ingredients to a feeding point. Normally, a large capacity belt conveyor is provided to feed dry materials to a mixing chamber, and the mixed feed is removed from one or more bagging outlets or a tubular, auger-fed bulk unloader can be temporarily mounted adjacent one of the bagging outlets to convey the feed from the mixing tank to bulk storage bins. The setting up and removal of the bulk unloader has required some time and it has been awkward to handle.

The object of the present invention is to provide an attachment for such apparatus which will supply an auxiliary feed for the dry materials and discharge for the mixed feed including a bulk discharge unit as a part thereof.

Another object is the provision of such an attachment wherein the bulk discharge unit can occupy a stored position and be swung to and from unloading position as needed.

A further object is to provide in a device of this kind a novel mounting for a bulk unloader which will facilitate its movement to and from unloading position.

Other objects of the invention will become apparent from the following description of one practical embodiment thereof, when taken in conjunction with the drawings which accompany, and form part of, this specification.

In the drawings:

Figure 1 is a perspective view of a truck having a mixing plant mounted thereon, as viewed from the side, with the attachment of the present invention in place on the tank and the bulk unloading conveyor in operative position;

Figure 2 is a perspective view of the equipment as viewed from the rear, with the unloading conveyor swung to inoperative position;

Figure 3 is a perspective view similar to Figure 2 but with the unloading conveyor shown in stored position;

Figure 4 is a vertical transverse section through a portion of the unloading conveyor and viewing the discharge conveyor in end elevation, and is taken on the line 4—4 of Figure 1;

Figure 5 is a vertical section taken on the line 5—5 of Figure 4;

Figure 6 is a partial vertical section through a receiving hopper and the windlass for raising and lowering the loading conveyor; and Figure 7 is a section taken on the line 7—7 of Figure 6 showing a locking dog for holding the windlass drum against rotation.

In general, the attachment of the present invention consists of a hopper, a feed conveyor to carry the dry ingredients from the hopper to the mixing tank of the mixing plant, a discharge conveyor, and a bulk loading conveyor which can be swung to operative position adjacent the outlet end of the discharge hopper and to a stored position above and parallel to the discharge conveyor.

Referring to the drawings in detail, there is shown a truck 1 on which is mounted a mixing tank 2 and such other equipment as is necessary to a grinding and mixing plant similar to the one disclosed in Patent No. 2,546,747.

The attachment with which this invention is concerned includes a discharge conveyor 3, a feed conveyor 4 and a bulk loader conveyor 5. The conveyors 3 and 4 will be of the screw type mounted in conveyor tubes 6 and 7. A feed hopper 8 may be attached at the inlet end of the feed conveyor 4. The feed screws within the conveyors 3 and 4 may be driven in any convenient manner. Conveyor 3 is shown as having its shaft 9 driven by chain drive 10 from beater shaft 11 of the mixing tank. Feed conveyor 4 may be driven from an appropriate hydraulic motor 12 by chain drive 13.

The feed and discharge conveyor are mounted at the lower side of the tank with the discharge conveyor above the feed conveyor and parallel thereto. The feed conveyor consists of a horizontal screw 46 coupled to a vertical screw 47 which enters the tank through an opening 48 in the tank wall. Thus, material dumped in the hopper 8 will be moved by the screws into the tank 2 where it will be mixed in the manner described in the above mentioned patents. Discharge conveyor 3 will also have communication with the tank through the opening 48, by means of an opening 49 in the back of the conveyor tube 6. The opening 49 may be controlled by a gate valve 50 to prevent entry of unmixed feed into the discharge conveyor.

In operating the device, dry material will be dumped into hopper 8 and fed by screws 46 and 47 into the tank where it will be mixed with whatever binder is to be used. When the mixing is complete, the gate 50 will be opened and conveyor screw 47 will lift mixed feed through opening 49, and it will be carried through the conveyor tube 6 by the discharge conveyor feed screw.

The bulk loading conveyor 5 is mounted at the outlet end of the discharge conveyor 3 to receive material ejected from the discharge conveyor and is capable of being swung in azimuth and assuming various vertical angles when in use, and may be moved to a stored position above and parallel to the discharge conveyor.

The bulk loader consists of a tubular boom 14 in which is mounted a screw conveyor 15, having its shaft 16 mounted in suitable bearings 17 at the ends of the tubular boom. The screw may be rotated by means of a chain drive 18 from a hydraulic motor 19 and flexible hose lines 20 carry the fluid to the motor from a suitable pump (not shown). The inlet end of the boom 14, that is the end adjacent the outlet end of conveyor 3, is widened at the top and open to form an inlet hopper 21 adapted to be positioned below the outlet end of the discharge conveyor 3.

The boom is mounted by means of a bail 22 which spans the open mouth of the hopper 21 and has its opposite ends pivotally mounted in the side walls of the boom. The boom will be free to rock about the pivotal connections with the bail to provide for vertical angular adjustment, as will be described. Bail 22 carries at its center a trunnion 23, extending at right angles to the pivotal axis of the bail and journalled for rotative movement within a bracket 24. Bracket 24 extends across the outlet end of the discharge conveyor 3 and is rotatably mounted upon an extension of the discharge conveyor screw shaft 9. The bracket is right angular, providing arms 25 and 26, with trunnion 23 being mounted in the arm 26 and the arm 25 being pivotally mounted on the extension of the shaft 9.

Thus, three axes of rotation are provided, each being at right angles to each of the other two. The bail pivots provide axes about which the boom may be tilted angularly to raise or lower its outer end; the trunnion 23 serves to permit swinging the boom in azimuth; and the pivotal mounted on shaft 9 allows the boom to move as a unit about the center of the discharge conveyor 3 from the stored position (as in Figure 3) to a position below the discharge conveyor where it will have its hopper 21 beneath the outlet end of the discharge conveyor 3.

The movements of the boom are controlled by means of a windlass 27 mounted on the side of the feed hopper 8. The windlass comprises a drum 28, rotated by means of a crank 29, and supported upon a U-shaped bracket 30. To hold the windlass against movement when desired, the drum is provided with a squared, or other polygonal, boss 31 and a lever 32 is pivotally mounted on the base of the bracket 30 and carries a block 33 to slip between the bracket 30 and a flat face of the boss 31. The boss and lever act in the manner of a ratchet and pawl.

The windlass cable 34 passes from the drum 28 around a pulley 35 mounted at the top of a post 36 projecting upwardly from a mounting socket 37 carried on the side of discharge conveyor 3. Post 36 carries a second pulley 38 around which the cable passes before extending to, and around, a pulley 39 attached to the boom 14 intermediate its ends. The free end of the cable then returns to be anchored to an arm 40 which projects horizontally from the top of post 36 and also carries the pulley 38. It will be obvious that when the boom is in its operative position, as shown in Figure 1, operation of the windlass will cause the boom to tilt about its pivotal connection with the bail 22 to raise or lower the outer end as desired.

When it is desired to store the boom after a bin has been filled, the windlass will be operated to lower the boom to its horizontal position. The boom will then be swung in a horizontal plane about its trunnion pivot 23 until it underlies the discharge conveyor 3. During all of these movements, the hopper 21 of the boom has remained beneath the outlet end of the discharge conveyor and has been in a position to receive feed from the conveyor. With the boom beneath the discharge conveyor, the operator will hook the cable line running from pulley 38 to pulley 39 around a hook 41 fixed to the under side of boom 14 near its base. Operation of the windlass will now exert a pull upon the boom from the side, causing the boom to pivot about its mounting on the discharge screw shaft 9 up to a position above the discharge conveyor. When in this position the lever 32 will be lowered to drop the block behind the boss 31 and lock the windlass against movement.

In order to provide support for the outer end of the boom and ensure uniform rotative movement of both ends of the boom, a chain 42 has one end secured to the tank 2 adjacent the free end of the boom when ready for storage and its other end hanging free. When the boom has been swung to a position beneath the discharge conveyor prior to lifting to stored position, the free end of the chain is brought forward beneath the boom and attached to a second hook 43 on the same side of the boom as the hook 41. The rolling movement of the boom about its pivot on shaft 9 as it is lifted will cause the boom to roll itself within the chain 43 so that the outer end of the boom will also be lifted. When the boom has rotated 180° around the discharge conveyor to its stored position the chain will have lifted the outer end of the boom to rest upon a bracket 44 fixed to the tank.

Operation of the windlass in a reverse direction will, of course, bring the boom to its lowered position. The chain 42 will be removed from hook 43 and the cable 34 freed from hook 41. The boom may then be swung to operative position.

If desired, the bracket 24 may carry a hood 45 to overlie the upper portion of the outlet end of the discharge conveyor when the boom is in operative position, to deflect feed downwardly into hopper 21. When the boom is being stored, the hood rotates with the bracket 24 to a position across the lower part of the discharge hopper outlet. This prevents spilling of feed which may be in the discharge conveyor.

It will be seen that the present invention provides a permanent mounting for a bulk loader which permits free movement of the loader boom while in use and storage of the boom where it will not project beyond the outlines of the apparatus when not in use.

While in the above one practical embodiment of the invention has been disclosed, it will be understood that the details of construction shown and described are by way of illustration and the invention may take other forms within the scope of the appended claims.

What is claimed is:

1. A loader for granular materials for attachment to apparatus having a horizontal discharge conveyor comprising, a tubular boom, conveyor mechanism in the boom, means to operate the conveyor mechanism, the boom being flared and open on one side adjacent one end to form an inlet hopper, a bail bridging the hopper transversely of the boom and pivotally connected to opposite sides of the hopper, a bracket having means for pivotal connection to the outlet end of the discharge conveyor at the center thereof for rotative movement about the longitudinal axis of the discharge conveyor, and a pivotal connection between said bail and said bracket having its axis at right angles to the axis of the bail connection to the boom and at right angles to the axis of the pivotal connection of the bracket to the discharge conveyor.

2. In a loader as claimed in claim 1, a windlass mounted on the apparatus and a cable, said cable being attached to said boom at a point removed from said bail and on the same side of the boom as the bail to raise and lower the boom about the bail pivot.

3. In a loader as claimed in claim 2, a hook on the side of the boom opposite the attachment of the cable and adjacent the hopper end to receive a bight of the cable whereby the boom may be bodily rotated about the discharge conveyor.

4. In a loader as claimed in claim 1, a windlass mounted on the apparatus and cable, said cable being attached to the boom at a point removed from said bail and on the same side of said boom as the bail to raise and lower the boom about the bail pivot, a hook on the side of the boom opposite from the attachment of the cable and adjacent the hopper end to receive a bight of the cable whereby the boom may be bodily rotated about the discharge conveyor, a chain attached at one end to the apparatus to hang down adjacent the free end of the boom when the boom is swung to underlie the discharge conveyor and extend below the free end of the boom, and a second hook attached to the boom in axial alignment with the first mentioned hook and adjacent the free end of the boom upon which to attach the free end of the chain after the free end of the chain has been drawn beneath the boom.

5. In a loader as claimed in claim 4, a bracket attached to said apparatus to seat the free end of the boom when the boom is rotated to a position above the discharge conveyor.

6. A loader for granular materials for attachment to apparatus having a discharge conveyor comprising, a tubular boom, a screw conveyor therein, means to rotate the screw conveyor, the boom being flared and open on one side adjacent one end to form an inlet hopper, and a mounting for connecting the boom to the discharge conveyor to permit the boom to occupy positions in which the boom is above and parallel to the discharge conveyor and in which the boom is below the discharge conveyor with the hopper beneath the outlet end of the discharge conveyor, the mounting including a pivot spanning the hopper to permit vertical angular movement of the boom, a pivot at right angles to the first mentioned pivot to permit movement of the boom in azimuth, and means for pivot connection to the discharge conveyor on the longitudinal axis of the conveyor to permit the boom to move bodily in an orbit around the axis of the discharge conveyor.

References Cited in the file of this patent

UNITED STATES PATENTS

| | | |
|---|---|---|
| 2,360,069 | Marvin | Oct. 10, 1944 |
| 2,417,020 | Shugart | Mar. 4, 1947 |
| 2,814,377 | Jirak | Nov. 26, 1957 |